United States Patent Office 2,950,332
Patented Aug. 23, 1960

2,950,332
CONVERSION OF KETONES TO AROMATICS

William Judson Mattox, Baton Rouge, La., assignor to Esso Research and Engineering Company, a corporation of Delaware No Drawing. Filed Nov. 26, 1958, Ser. No. 776,399

4 Claims. (Cl. 260—668)

The present invention relates to the production of aromatic compounds by the condensation of carbonyl compounds in the presence of a crystalline zeolitic catalyst. More specifically, the present invention relates to the preparation of alkyl and polyalkyl aromatic compounds of high antiknock value, suitable for use as motor fuel constituents. Still more specifically, the present invention relates to a novel process for preparing polyalkylated benzenes, such as mesitylene, and its analogues and homologues by condensation of ketones in the presence of a catalytic composition peculiarly adapted to produce high yields of alkylated aromatics.

Alkylated aromatics boiling in the naphtha range, such as mesitylene, are known to be capable, when added to naphthas boiling in the gasoline fraction, of imparting a high degree of antiknock capability. Various methods for the production of alkylated aromatics by combining olefinic or similar unsaturated material, either from products of a conventional thermal or catalytic cracking process or from other sources, with aromatic compounds such as benzene or its homologues, have been proposed.

It is an object of the present invention to provide a highly effective process for producing alkyl aromatics by condensing ketones having the formula

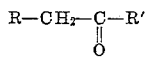

wherein R may be hydrogen or an alkyl or aryl radical, and R' is an aryl or alkyl radical in the presence of a crystalline metallo-alumino-silicate zeolite having uniform pore openings of from 6 to 15 Angstroms.

A still further object of the present invention is to prepare polyalkylated benzenes in high yield by reacting a ketone containing at least one hydrogen atom on a carbon atom alpha to the carbonyl group in the presence of a highly adsorbent crystalline alumino-silicate zeolite having uniform pore openings of from 6 to 15 Angstrom units.

Other and further objects and advantages of the present invention will become more clear hereinafter.

It has now been found that these polyalkylated benzenes may be prepared in high yields by reacting a ketone in the presence of a crystalline metallic alumino-silicate zeolite having uniform pore openings of about 6 to 15 Angstroms, whereby the individual molecules are freely admitted into the pores, and the resultant aromatic product may be readily removed therefrom.

Alumino-silicates of high condensation activity may be prepared by mixing and heating sodium aluminate and sodium silicate, preferably metasilicate, under carefully controlled conditions to produce a crystalline product which is subsequently dehydrated under conditions to preserve the crystalline structure. The sodium content of the crystalline alumino-silicate may, if desired, be replaced by effecting ion exchange with an appropriate metal salt such as a group II, III or IV metal. The metal ion influences the size of the pore openings, as does the ratio of the reagents and the reaction conditions.

In accordance with the present invention, the condensation catalyst may be prepared from a sodium silicate having a high ratio of soda to silica. The ratio is at least 0.8/1, and may be as high as 2/1. Preferably, however, the ratio is 1/1, and the desired reagent is sodium metasilicate.

Sodium aluminates having any ratio of soda to alumina in the range of 1/1 to 3/1 may be employed; however, a sodium aluminate having a high ratio of soda to alumina is preferred, and a sodium aluminate having the ratio 1.5/1 $Na_2O/Al_2O_3$ is particularly desirable. The amounts of sodium silicate solution and sodium aluminate solutions are such that the ratio of silica to alumina in the final mixture is at least 3/1 and preferably about 4/1 to 10/1.

The method of mixing the sodium metasilicate and sodium aluminate solutions should be carried out in a manner allowing formation of a precipitate having a uniform composition. A preferred method is to add the sodium aluminate to the sodium metasilicate at ambient temperatures using rapid and efficient agitation to make a homogeneous paste. Thereafter the mixture is heated to about 180° to 215° F. for an extended period of an hour or longer to ensure crystallization in the crystal form necessary to adsorb aromatic molecules. It has been found that the heat soaking period is essential to produce the desired product, which has a pore opening of about 13 Angstroms. The final product, after dehydration, has an empirical formula—$Na_2O.Al_2O_3.2.7\pm0.5SiO_2$. It is preferably activated at 400° to 1000° F.

The process of manufacture may be modified in various ways. Thus, it may be desirable to base-exchange the recovered zeolite with another ion, such as calcium or other alkaline earth element to form a calcium sodium alumino-silicate. This base exchange modifies the size of the pore openings. The base exchange may be carried out with water soluble metal salts of groups I to III of the Periodic System. The base exchanged zeolite has the formula

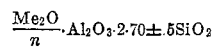

wherein Me is the metal cation, and $n$ is its valence. Where this is done, the filter cake of sodium aluminosilicate may be base-exchanged with a solution of a calcium salt or other salt solutions before drying, though this is not essential. The crystalline precipitate of sodium alumino-silicate may be dried, activated by heating to about 700° to 900° F. and used as such, or if desired, the dried alumino-silicate may be base exchanged with a salt solution.

Base exchanging may be carried out by treating the wet precipitate in the filter with a salt solution, or by reslurrying the precipitate in a salt solution. Besides sodium, other alkali aluminates and metasilicates such as potassium, lithium and the like may be employed. Similarly, other water soluble salts may be employed in the base exchange reaction in place of calcium salts. For example, salts of potassium, lithium, strontium, magnesium, zinc, cadmium, and the like may be employed. Magnesium is particularly desirable.

Suitable ketones which may be used in the process of this invention comprise those ketones which contain at least one hydrogen atom on a carbon atom alpha to the carbonyl grouping. Such ketones have the formula

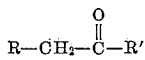

in which R comprises either hydrogen, alkyl or aryl radicals and R' may comprise either an alkyl or aryl radical. The preferred ketones of this invention comprise those in which R consists of a hydrogen radical. Ketones which may be used include acetone, methyl ethyl ketones, methyl propyl ketone, methyl butyl ketone, diethyl ketone, ethyl propyl ketone, ethyl butyl ketone, dipropyl ketone, propyl butyl ketone, diisopropyl ketone, isopropyl butyl ketone, dibutyl ketone, diisobutyl ketone, etc., acetophenone, ethyl phenyl ketone, propyl phenyl ketone, butyl phenyl ketone, isopropyl phenyl ketone, etc., benzyl phenyl ketone, etc.

When acetone is treated in the process of the present invention, the polyalkylated benzene which is formed is 1,3,5-trimethylbenene (mesitylene). The chief product obtained from methyl ethyl ketone is 1,3,5-triethylbenzene; from acetophenone, 1,3,5-triphenylbenzene.

The reaction of this invention is usually carried out at a temperature in the range of from about 300° to about 900° F. or more, the preferred range being from about 450° to about 800° F. Generally speaking, pressures ranging from about atmospheric to about 100 atmospheres or more are used, the superatmospheric pressures being either autogenous pressures or those obtained by the use of an inert gas such as nitrogen.

The condensation reaction is carried out in equipment of conventional type. A ketone, such as acetone or an acetone concentrate is fed to a reactor packed with the alumino-silicate catalyst and maintained at a temperature within the approximate range of 300° to 900° F., preferably 450° to 800° F., and at a pressure which may vary up to about 1000 p.s.i.g. The reaction product is passed to gas separator for recovery of unconverted acetone which is recycled to the reactor. Liquid product from this separator is transferred to a distillation column for separation of unconverted ketone, polyalkyl aromatics, and higher condensation products.

In addition to the advantages already mentioned for the alumino-silicate catalyst, the adaptability of this catalytic material to various modes of contacting is outstanding in comparison with previously known catalysts. For example, the alumino-silicate may be used in fixed-bed or moving-bed reactors, as pellets or various shaped forms, as a fluidized powder, or as a powder dispersed or suspended in the liquid hydrocarbon or in some suitable fluid. Further, the alumino-silicate not only is characterized by long life but is completely restored in activity after prolonged use by simple oxidation treatments with air or other oxygen-containing gas. The usual high catalyst losses and/or expense resulting from reworking of conventional catalysts are avoided.

The process of the present invention may be further illustrated by the following examples.

A crystalline sodium alumino-silicate having a pore opening of about 13 Angstroms, and prepared in a manner similar to that described heretofore was employed as a condensation catalyst. The sodium alumino-silicate was prepared in aqueous medium at a final pH of 10 to 12, and even after drying and calcining at 850° F. an aqueous suspension showed a pH of 10 to 11, indicating the basic nature of this catalyst.

Example 1

Acetone was vaporized and passed at atmospheric pressure and a feed rate of 0.1 volume liquid per volume catalyst per hour into a fixed-bed of 13 Angstrom sodium alumino-silicate maintained at a temperature of 500° F. The acetone was converted under these conditions to the extent of 43% per pass to aromatic hydrocarbons. Distillation and physical property data on the aromatic product showed 69% trimethylbenzenes and 31% of higher boiling aromatics.

Example 2

Acetone was converted in the same manner as described for Example 1 but at a reaction temperature of 600° F. The acetone conversion was increased to 70% per pass and the liquid product was essentially completely aromatic. However, some gas formation indicated a somewhat lower selectivity.

Example 3

Acetone was passed over activated alumina at 500° F. as in Example 1. The selectivity to aromatics was approximately 50% of that obtained with the alumino-silicate catalyst and a much higher proportion of these products was in the 400° F.+ boiling range and, therefore, outside the gasoline boiling range.

Example 4

Acetone vapor was passed under the same conditions as in Example 1 into a fixed-bed of non-crystalline sodium alumino-silicate sold commercially under the trade name of "Decalso" and having a surface area of 129 sq.m./g. Acetone conversion amounted to only 10% and aromatics yield 9%.

Example 5

A 4 Angstrom type sodium alumino-silicate $$(Na_2O \cdot Al_2O_3 \cdot 2SiO_2)$$

was evaluated as in Example 1. Acetone conversion amounted to only 9% and aromatics yield 8%.

In Example 4 above, wherein a non-crystalline sodium alumino-silicate having a high degree of porosity was employed, low conversions and yields were obtained. The zeolite is an amorphous plural gel, having three components, namely $Na_2O$, $Al_2O_3$, and $SiO_2$. It is manufactured by the Permutit Company.

In Example 5 it is seen that it is not enough for a zeolite to have catalytic activity if it be crystalline and of uniform pore size. It must also have a pore size large enough to adsorb the reactants and enable the product to be desorbed.

What is claimed is:

1. A process for the preparation of a polyalykylated aromatic compound which comprises reacting a ketone having the formula

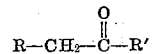

wherein R is selected from the group consisting of hydrogen, alkyl and aryl radicals and R' is selected from the group consisting of alkyl and aryl radicals in the presence of a crystalline metallic alumino-silicate zeolite having a uniform pore opening of about 6 to 15 Angstrom units at a temperature of from about 300° to about 900° F.

2. An improved process for condensing ketones having the formula

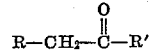

wherein R is selected from the group consisting of hydrogen, alkyl and aryl radicals and R' is selected from the group consisting of alkyl and aryl radicals in the presence of a crystalline metallic alumino-silicate zeolite having an empirical formula

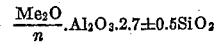

wherein Me is a metal and $n$ is its valence, and wherein said zeolite has a uniform pore opening of about 10 to 13 Angstrom units at a temperature of from about 300° to 900° F.

3. The process of claim 2 wherein said zeolite is $Na_2O \cdot Al_2O_3 \cdot 2.7SiO_2$ and has uniform pore openings of about 13 Angstrom units.

4. The process of claim 2 wherein said ketone is acetone and said product is mesitylene.

References Cited in the file of this patent

UNITED STATES PATENTS

| | | |
|---|---|---|
| 1,728,732 | Jaeger | Sept. 17, 1929 |
| 2,419,142 | Ipatieff et al. | Apr. 15, 1947 |
| 2,833,833 | Schmerling | May 6, 1958 |